J. DESCHAMP.
COTTON CHOPPER.
APPLICATION FILED APR. 7, 1910.
965,572.
Patented July 26, 1910.
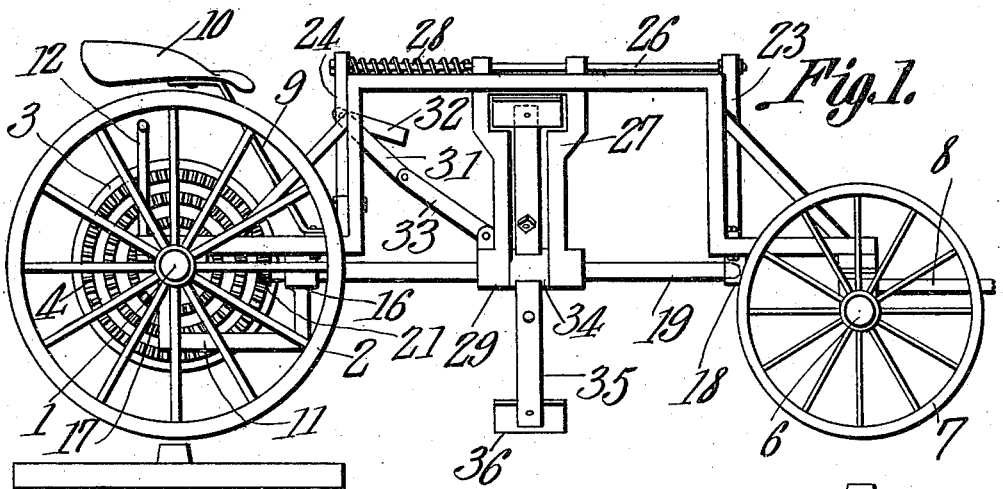
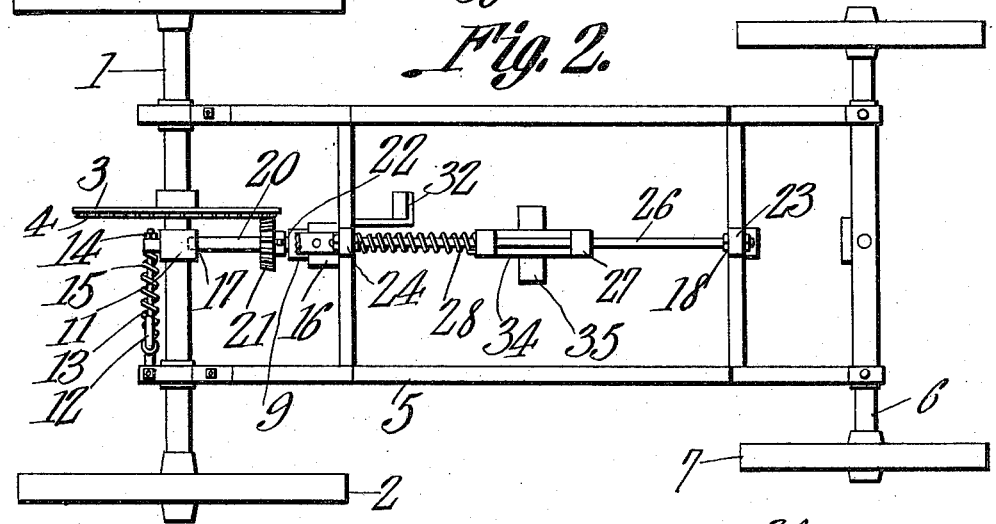
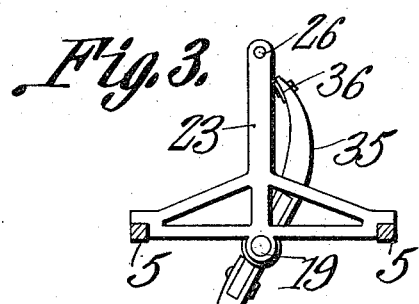
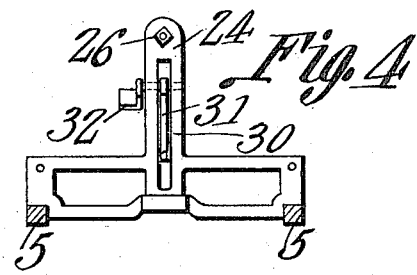
Witnesses
John Deschamp,
Inventor
by Cashow & Co.
Attorneys

UNITED STATES PATENT OFFICE.

JOHN DESCHAMP, OF CORYDON, INDIANA, ASSIGNOR OF ONE-HALF TO EDWARD KNAPP, OF CORYDON, INDIANA.

COTTON-CHOPPER.

965,572.  Specification of Letters Patent.  Patented July 26, 1910.

Application filed April 7, 1910. Serial No. 553,923.

*To all whom it may concern:*

Be it known that I, JOHN DESCHAMP, a citizen of the United States, residing at Corydon, in the county of Harrison and State of Indiana, have invented a new and useful Cotton-Chopper, of which the following is a specification.

This invention relates to a cotton chopper and consists in the novel construction and arrangement of its parts as hereinafter shown and described.

The object of the invention is to provide a chopping machine which is of the selective type, that is to say, that as the machine progresses along a row of standing plants the chopping mechanism may be advanced or retarded with relation to the movement of the machine whereby undesirable plants may be chopped out of the row and the desirable plants left standing irrespective of the intervals at which they occur.

With this object in view the cotton chopper includes a frame mounted at its rear portion upon a fixed axle and at its forward portion upon a pivoted axle. Shiftable bearings are mounted upon the rear axle and a pillow bearing is provided upon the frame. A shaft is journaled for rotation in the said bearings and is provided with a yoke or is journaled in a yoke which is mounted upon a guide attached to the said frame. Means is provided for moving the said yoke along the frame. Arms are fixed to the said shaft and are located within the yoke and carry chopping blades. Means is provided upon the rear axle for rotating the said shaft and means is provided for shifting the bearings upon the rear axle so that the said shaft may be thrown in or out of gear as desired.

In the accompanying drawings;—Figure 1 is a side elevation of the cotton chopper. Fig. 2 is a top plan view of the same. Fig. 3 is a front end elevation of a portion of the frame of the cotton chopper. Fig. 4 is a rear end elevation of a portion of the frame of the cotton chopper.

The cotton chopper consists of a rear axle 1 to the end of which are fixed traction wheels 2. A disk 3 is fixed upon the intermediate portion of the axle 1 and is provided with several series of concentrically arranged teeth 4.

A frame 5 is mounted at its rear end upon the axle 1 and the said frame at its forward end is mounted upon a pivoted axle 6 which in turn is supported by ground wheels 7. A draft tongue 8 is attached to the pivoted axle 6 in the usual manner. A seat post 9 is mounted upon the rear portion of the frame 5 and a seat 10 is located upon the upper end of the said post.

A bracket 11 is slidably mounted upon the axle 1 and a crank shaft 12 is journaled at its crank in one of the side members of the frame 5. A bolt 13 is journaled at one end upon the shaft 12 and at its other end passes through the bracket 11. The said bolt 13 is slidably connected with the said bracket and is provided at its inner end with an adjustable nut 14. A coiled spring 15 is interposed between the bracket 11 and the enlargement at the outer end of the bolt 13 and is under tension with a tendency to hold the bracket 11 toward the nut 14. The bracket 11 is provided with a journal bearing 16 and a pillow or thrust bearing 17 and the frame 5 is provided at a point intermediate its opposite sides and in the vicinity of its forward end with a pillow or thrust bearing.

A shaft 19 is journaled at its forward end in the pillow or thrust bearing 18, at its rear end in a pillow or thrust bearing 17 and at a point between its ends in the journal bearing 16. The shaft 19 is provided in the vicinity of its rear end with a non-circular portion 20 upon which a beveled pinion 21 is adjustably mounted and which is provided at its hub with a set screw 22, whereby it may be secured in an adjusted position upon the non-circular portion 20 of the said shaft 19. The said pinion 22 is adapted to mesh with either one of the series of teeth 4 upon the disk 3 and therefore it will be seen that when the pinion 21 is so positioned that it is in mesh with an innermost set of teeth 4 it will rotate at a slower rate of speed than when it is in mesh with an outermost set of teeth 4 upon the said disk 3. An upright post 23 is mounted upon the forward portion of the frame 5 and an upright post 24 is mounted upon the rear portion of the said frame. A shaft 26 connects the upper end portions of the said posts 23 and 24 together. A yoke 27 is slidably mounted upon the shaft 26 and a coiled spring 28 surrounds the rear portion of the said shaft 26 and is attached at its forward end to the yoke 27 and at its rear end with the upper portion of the post 24. The spring 28 is a traction spring and is under tension with a tendency to hold the yoke 27 toward the post 24. The yoke 27 is provided at its lower end with bearings 29 which receive the shaft 19.

As illustrated in Fig. 4 of the drawings the post 24 is provided with a vertically disposed slot 30 in which a lever 31 is fulcrumed. A treadle 32 is fixed with respect to the lever 31 and is located within convenient reach of one occupying the seat 10. A link 33 pivotally connects the working end of the lever 31 with the yoke 27. Therefore it will be seen that an operative occupying the seat 10 may place his foot upon the treadle 23 and swing the lever 31 whereby the link 33 may be moved longitudinally and yoke 27 will be slid along the shafts 19 and 26 and against the tension of the spring 28.

A head 34 is mounted upon the shaft 19 and is located between the lower end of the yoke 27 and the bearings 29 thereof. The head 34 is adapted to slide along the shaft 19 but is constrained to rotate in unison with the same. Radially disposed arms 35 are attached at their inner ends to the head 34 and chopping blades 36 are mounted at the outer ends of the said arms 35.

From the above description it will be seen that when the machine is moving over the surface of the ground and the shaft 12 is swung so that its intermediate portion is carried beyond the outer side of the side member of the frame 5 in which it is journaled that the bracket 11 is moved away from the disk 3 and consequently the beveled pinion 21 will be carried out of engagement with the teeth upon the said disk. Consequently the shaft 19 will not rotate. When however, the shaft 12 is swung back in the position as shown in Fig. 2 the beveled pinion 21 will be in mesh with one of the sets of teeth 4 upon the disk 3 and the shaft 19 will rotate. Therefore as the machine progresses along a row of standing plants an operative occupying the seat 10 may observe the rows of plants and by swinging the lever 31 through the instrumentality of the treadle 32, the head 34 may be moved along the shaft 19 so that the blades 36 may be caused to chop out the undesirable plants and leave the desirable plants standing in the row irrespective of the distance between the said desirable plants. It is of course understood that the lever mechanism 31 is used in the main for forcing the yoke 27 and its attachment away from the post 24, while the traction spring 28 may in a great measure be relied upon to bring the yoke 27 back toward the said post 24. Also it will be seen that by shifting the beveled pinion 21 upon the non-circular portion of the shaft 19 and securing the same in an adjusted position the said shaft 19 may be caused to rotate at a relative fast or slow rate of speed as desired. Therefore a simple and durable cotton chopper is provided which will effectually chop the plants out of the standing row and may be manipulated to operate upon the said plants in a selective manner to leave the desirable plants standing, while those plants which are not desirable may be removed irrespective of the distance between the desirable plants.

Having described the invention what I claim as new and desire to secure by Letters Patent is:—

A cotton chopper comprising a front and rear wheel supported axle, a frame mounted upon said axles, a shaft journaled at its forward portion in the frame, means for operatively connecting said shaft with the rear axle, a guiding shaft supported on said frame, a yoke slidably mounted upon the guiding shaft, a spring connected at one end to the yoke and at its other end with a fixed point and being under tension with a tendency to hold the said yoke in a rearmost position, said yoke having bearings which receive the first said shaft, a head slidably mounted upon the first said shaft but constrained to rotate with the same and located between the ends of the yoke, arms carried by said head, chopping blades carried by said arms, and a lever mechanism mounted upon the frame and adapted to be operated to move the yoke along said shaft against the tension of said traction spring.

In testimony that I claim the foregoing as my own, I have hereto affixed my signature in the presence of two witnesses.

JOHN DESCHAMP.

Witnesses:
 JULIUS BOSIER,
 JERRY BINKLEY.